(12) United States Patent
    Wainwright

(10) Patent No.: US 10,269,272 B1
(45) Date of Patent: Apr. 23, 2019

(54) REMOTE CONTROLLED OPTICAL COUPLER WITH CHARGER, GPS, AND AUDIO I/O

(71) Applicant: Harry Lee Wainwright, Monessen, PA (US)

(72) Inventor: Harry Lee Wainwright, Monessen, PA (US)

( * ) Notice: Subject to any disclaimer, the term of this patent is extended or adjusted under 35 U.S.C. 154(b) by 0 days.

(21) Appl. No.: 15/810,210

(22) Filed: Nov. 13, 2017

Related U.S. Application Data

(60) Provisional application No. 62/497,969, filed on Dec. 12, 2016.

(51) Int. Cl.
| | |
|---|---|
| *G03B 15/05* | (2006.01) |
| *G09F 9/305* | (2006.01) |
| *H04B 10/11* | (2013.01) |
| *G09F 13/04* | (2006.01) |

(52) U.S. Cl.
    CPC ............. *G09F 9/305* (2013.01); *H04B 10/11* (2013.01); *G09F 2013/0463* (2013.01)

(58) Field of Classification Search
    CPC ...... G02B 6/0018; G02B 6/002; G02B 6/006; G02B 6/24; G02B 6/241; G02B 6/26; G02B 6/27; G02B 6/28; G02B 6/2804; G02B 6/2861; G02B 6/36; G02B 6/00; G02B 6/0001; G02B 6/0005; G02B 6/0006; G02B 5/0008; G02B 6/04; G02B 6/041; G02B 6/043; G02B 6/10; G02B 6/024; G02B 6/036; G03B 15/02; G03B 15/05; F21V 7/0075; F21V 7/048; F21V 7/10; G02F 2001/1336; G02F 2001/133615; G02F 2001/133616; G02F 1/011
    See application file for complete search history.

(56) References Cited

U.S. PATENT DOCUMENTS

| | | | |
|---|---|---|---|
| 3,836,911 A | | 9/1974 | Gibson et al. |
| 3,934,246 A | | 1/1976 | Mueller |
| 3,949,397 A | | 4/1976 | Wagner et al. |
| 4,017,157 A | | 4/1977 | van Riet |
| 4,185,276 A | | 1/1980 | Benson |
| 4,540,242 A | | 9/1985 | Shibuya et al. |
| 4,709,307 A | | 11/1987 | Branom |
| 4,727,603 A | * | 3/1988 | Howard ............... A41D 27/085 2/115 |
| 4,862,176 A | | 8/1989 | Voles |

(Continued)

*Primary Examiner* — Van T Trieu
(74) *Attorney, Agent, or Firm* — Thomas M. Joseph, Esq

(57) ABSTRACT

An input device, an optical coupler having a receiver, a processor, and one or more light emitting diodes, a light conductive material such as a bundle of optical fibers, and a connector connecting the optical coupler to the light conductive material such as a bundle of fiber optic fibers is provided. The receiver receives data from the input device that relates to lighting effects having predetermined routine or graphic patterns. The processor converts the data into instructions for the light emitting diodes to form the predetermined graphic patterns, color routines and intensities. The light emitting diodes produce light for transmission through the connector to the light conductive material such as a bundle of fiber optic fibers so that the bundle of fiber optic fibers can produce the predetermined light patterns, routines, intensities or graphic patterns.

19 Claims, 11 Drawing Sheets

(56) References Cited

U.S. PATENT DOCUMENTS

| | | | |
|---|---|---|---|
| 4,875,144 A * | 10/1989 | Wainwright | A41D 27/085 |
| | | | 362/103 |
| 4,910,521 A | 3/1990 | Mellon | |
| 5,046,394 A | 9/1991 | Suzuki et al. | |
| 5,128,843 A | 7/1992 | Guritz | |
| 5,225,828 A | 7/1993 | Walleston | |
| 5,247,600 A | 9/1993 | Williams et al. | |
| 5,293,437 A | 3/1994 | Nixon | |
| 5,299,227 A | 3/1994 | Rose | |
| 5,461,188 A | 10/1995 | Drago et al. | |
| 5,585,871 A | 12/1996 | Linden | |
| 5,796,362 A | 8/1998 | Ayasli et al. | |
| 5,870,215 A | 2/1999 | Milano et al. | |
| 5,929,777 A | 7/1999 | Reynolds | |
| 6,064,502 A | 5/2000 | Burns et al. | |
| 6,151,439 A | 11/2000 | Wainwright | |
| 6,256,129 B1 | 7/2001 | Kim et al. | |
| 6,413,341 B1 | 7/2002 | Wainwright | |
| 6,466,710 B1 | 10/2002 | Pergande | |
| 6,651,365 B1 * | 11/2003 | Wainwright | G09F 9/305 |
| | | | 362/806 |
| 6,698,330 B1 | 3/2004 | Witte et al. | |
| 6,926,451 B2 * | 8/2005 | Cauwels | G02B 6/4292 |
| | | | 385/100 |
| 7,023,454 B1 * | 4/2006 | Knight | G06T 3/0093 |
| | | | 345/473 |
| 7,145,536 B1 | 12/2006 | Yamazaki et al. | |
| 7,611,255 B1 * | 11/2009 | Lagassey | A42B 1/244 |
| | | | 362/103 |
| 7,699,485 B1 * | 4/2010 | Lagassey | A42B 1/244 |
| | | | 362/103 |
| 8,217,922 B2 * | 7/2012 | Wainwright | G06T 13/205 |
| | | | 345/204 |
| 8,647,167 B2 | 2/2014 | Heilbron et al. | |
| 8,655,345 B2 | 2/2014 | Gold | |
| 8,659,400 B2 | 2/2014 | Arling et al. | |
| 8,666,367 B2 | 3/2014 | Sharp et al. | |
| 8,670,742 B2 | 3/2014 | Yeh et al. | |
| 8,670,743 B2 | 3/2014 | Wang | |
| 8,670,756 B2 | 3/2014 | Matsuyama | |
| 9,618,827 B2 * | 4/2017 | Shatz | G03B 15/05 |
| 9,712,730 B2 * | 7/2017 | Phillips | H04N 5/2252 |
| 2006/0022214 A1 * | 2/2006 | Morgan | F21K 9/00 |
| | | | 257/99 |
| 2014/0028210 A1 * | 1/2014 | Maxik | F21V 23/06 |
| | | | 315/200 R |
| 2016/0209025 A1 * | 7/2016 | Matthews | F21L 4/04 |

\* cited by examiner

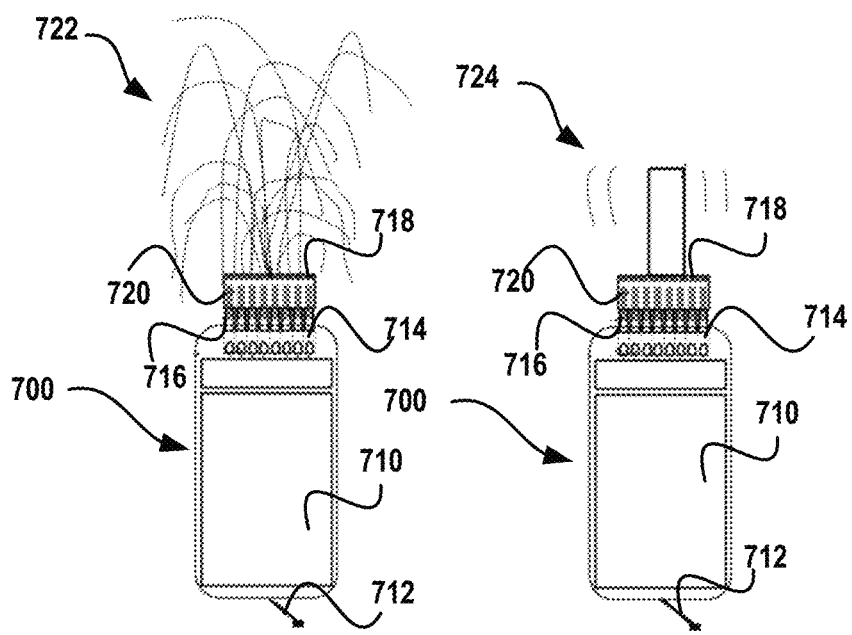
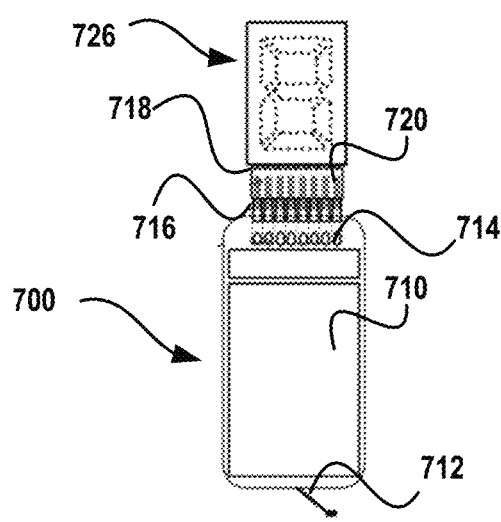
FIG. 7A  FIG. 7B
FIG. 7C

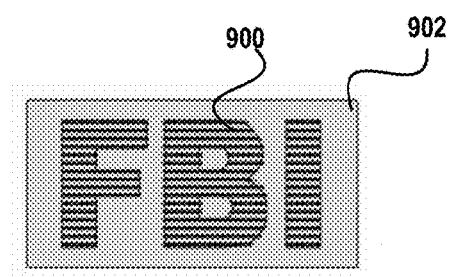
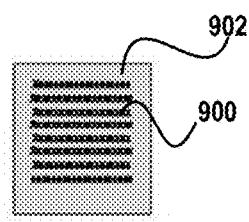
FIG. 9A  FIG. 9B
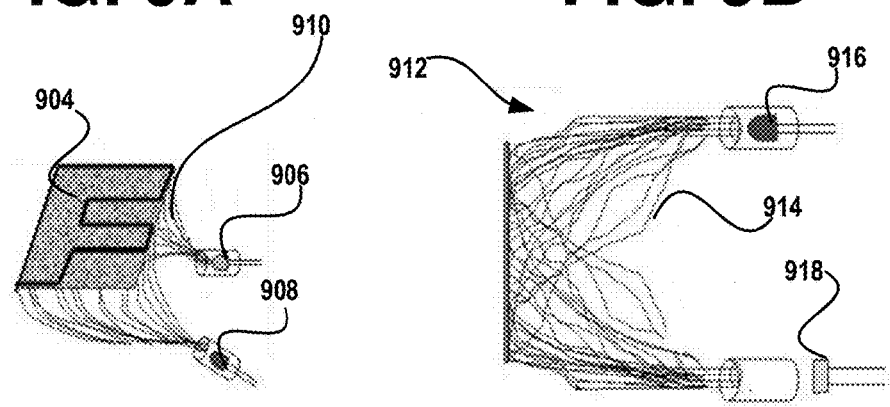
FIG. 9C  FIG. 9D

REMOTE CONTROLLED OPTICAL COUPLER WITH CHARGER, GPS, AND AUDIO I/O

CROSS REFERENCE TO RELATED APPLICATION

This application claims the benefit under 35 U.S.C. § 119(e) of U.S. Provisional Application No. 62/497,969 entitled "REMOTE CONTROLLED OPTICAL COUPLER WITH CHARGER, GPS, AND AUDIO I/O" filed Dec. 12, 2016, which is incorporated herein by reference.

BACKGROUND

The advent of smartphones has produced a market for software accessories that include thousands of products that enhance, assist, and affect our lives in ways that were not imagined a decade ago. Phone applications have grown the market into a multi-billion dollar industry providing everything from radio frequency (RF) connected security systems, controlling lights in a home for energy efficiency, and viewing cameras remotely at the touch of a screen.

Various patents have disclosed inventions relating to electronics or electronic components that may or may not be relevant to the smartphone accessory market. Some patents have disclosed inventions relating to remote control electronic parts, such as wires, lights, printed circuit boards, switches, and more to produce lighted effects on surfaces. Examples include U.S. Pat. Nos. 8,670,743 and 8,670,756. U.S. Pat. No. 8,655,345 discloses proximity sensing and control. U.S. Pat. Nos. 8,659,400 and 8,666,367 disclose remote control of portable digital devices. Electronic parts are susceptible to failure though contact with water, breaking, shorting out, or other means normally associated with electronic components.

It is known to employ electronics attached to the item to generate a lighted display. It is also known to use colors, routines, and speeds that were controlled by a chip that was pre-programmed to display certain images, such as in U.S. Pat. No. 6,651,365, which discloses a method of creating animations on flexible surfaces using fiber optics and programmable driver without any mention of audio synchronization of defined optical frames to accompany such depicted animations or any mention of remote controlling of such displays.

It is known to control lighted displays remotely, but known methods and systems utilize electronics mounted in the item. An example of such an arrangement is disclosed in U.S. Pat. No. 4,185,276, which discloses a spatial energy field including a sound and light generator and discriminator for providing electrical signals to a plurality of individual stations resulting in the formation of dynamic geometrical shapes, patterns and designs to display according to particular pitches and amplitudes in the music.

U.S. Pat. No. 5,247,600 discloses the use of a series of rigid layers and UV filters. U.S. Pat. No. 3,934,246 discloses the use of solid supports for identifying alphanumeric characters on a typewriter keyboard. U.S. Pat. No. 5,585,871 discloses the use of fiber optic cables that transmit full images of a display remotely. U.S. Pat. No. 5,293,437 discloses the transmission of full images from a distant display.

Some patents disclose systems and methods for producing dynamic displays. For example, U.S. Pat. No. 5,128,843 discloses an optical display device that is secured to active limbs of a body in motion. The body movement enhances an optical display that illuminates the wearer for ornamental or safety purposes. The device consists of a plurality of lamps which are coupled to four flexible strip circuit boards. Each circuit board has a translucent shield placed over the length of the circuit board to cover the lamps for protection from moisture, impact and provide alternative colored illumination. Placement of the device is on each upper arm of the user with a second circuit board positioned on each portion of a person's lower arm. A control circuit is included for energizing the lamps. The device is prone to failure, such as shorts and wire breakage points, because wires and components are installed in the item.

Some patents have disclosed inventions that relate to electronics and to fabrics or to clothing. For example, U.S. Pat. No. 4,875,144 discloses a fabric illuminated by the outer ends of a large number of optical fibers that form an illuminated changing display of several figures. The fibers extend along the inner surface of the fabric and are gathered into several bundles each of which engages a connector housing having a light source. The light source is connected to a power source that energizes an electronic control device which sequentially causes each light source to be activated in a programmed manner.

U.S. Pat. No. 4,709,307 discloses an article of clothing that includes a shell forming an outer layer, a liner disposed generally inside the shell and forming an inner layer of the clothing, and a set of light-emitting diodes (LEDs) forming a predetermined pattern on the exterior of the clothing. A power source is located within the clothing, for illuminating the LEDs as is a control circuit for controlling the activation of the LEDs. A cable electrically connects the LEDs and the power source and an overlay secured to the shell, has imprinted a pattern corresponding to the predetermined pattern of the LEDs.

U.S. Pat. No. 3,836,911 discloses data digital displays in which mechanical mechanisms prevent the use on garments or fabrics such using a spinning wheel matrix of numbers to display lighted numerals through fiber optics.

U.S. Pat. No. 5,461,188 discloses the use of synthesized music and sound to activate a light system incorporated into an article of clothing that includes shoes, jackets, arm bands and waist bands that light up patterns. The disclosed system results in non-associative patterns lighting up by frequency triggers in the audio tracks. The system utilizes electronics that are not machine washable.

The need for thin flexible data displays is growing in many applications as research and development of such technologies moves forward to bring the pricing down and manufacturing capacities up to meet anticipated demands. Black and White E-Inks (Ink that responds to electrical charges and is able to change the appearance of print on a surface as thin as paper), Mylar (paper thin) video screens are being developed for applications as Plasma, LED screens, and other technologies cannot be applied to such thin surfaces cost-effectively or otherwise. Organic light emitting diodes (OLEDs) and LCDs that are used in many Multi-meters for data displays and screens on mobile phones and other products require a solid foundation along with protection to support protect the screens from breakage, but remain prone to breakage if impacted hard enough by foreign objects.

U.S. Pat. Nos. 4,540,242 and 7,145,536 disclose liquid crystal display (LCD) screens that are commonly used to display data are difficult to see unless back lighted resulting in additional current draw requirements.

It has long been recognized that a system for identifying friend or foe (IFF) and immediately determining the physical state of individuals from a distance is needed in both military and civilian employment that is not only useful in its function, but also cost effective enough to be considered for widespread usage throughout a wide range of applications. Many systems have been suggested for use in the past with respect to IFF using data transmission via IR carriers involving encryption and decryption of data, including U.S. Pat. Nos. 5,225,828, 6,466,710, and 6,698,330. Other patents disclose the use of RF, such as U.S. Pat. Nos. 3,949,397 and 4,862,176.

The above-described methods rely upon a transmitter, receiver, or transponder mounted somewhere on the item or individual in the line of sight of the corresponding receiver/transmitter of an observer. Indeed, if the transponder is located out of sight of the corresponding receiver, the "line-of-sight" methods fail to work since it is the nature of IR to be in the "line-of-sight" to function as a data transmission method. RF is not desirable for use on battlefields due to an enemy's ability to intercept such transmissions and use them for their own purposes. Plus, they all contain electronics that are exposed to adverse environmental conditions and punishment.

U.S. Pat. No. 5,870,215 discloses a system that utilizes RF to activate an IR transmission ID verification signal back to a receiver, but the same issue remains regarding the line-of-sight necessity that infrared needs to function so that stepper motors and additional circuitry for decoding purposes were added to allow a 360 degree transmission area to be realized. These modifications add weight and require more power, thus increasing the necessity for additional batteries to keep these units operational for extended periods of time in situations where replacement batteries cannot be available.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, an apparatus includes an input device, an optical coupler having a receiver, a processor, and a plurality of light emitting diodes, a bundle of fiber optic fibers, and a connector connecting the optical coupler to the bundle of fiber optic fibers. The receiver receives data from the input device that relates to lighting effects having predetermined graphic patterns. The processor converts the data into instructions for the plurality of light emitting diodes to form the predetermined graphic patterns. The plurality of light emitting diodes produce light for transmission through the connector to the bundle of fiber optic fibers so that the bundle of fiber optic fibers can produce the predetermined graphic patterns.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIGS. 7A-7C illustrate schematic diagrams of another embodiment of the disclosed subject matter.

FIGS. 9A-9D illustrate exemplary output produced in accordance with the disclosed subject matter.

DETAILED DESCRIPTION

Figure 1:
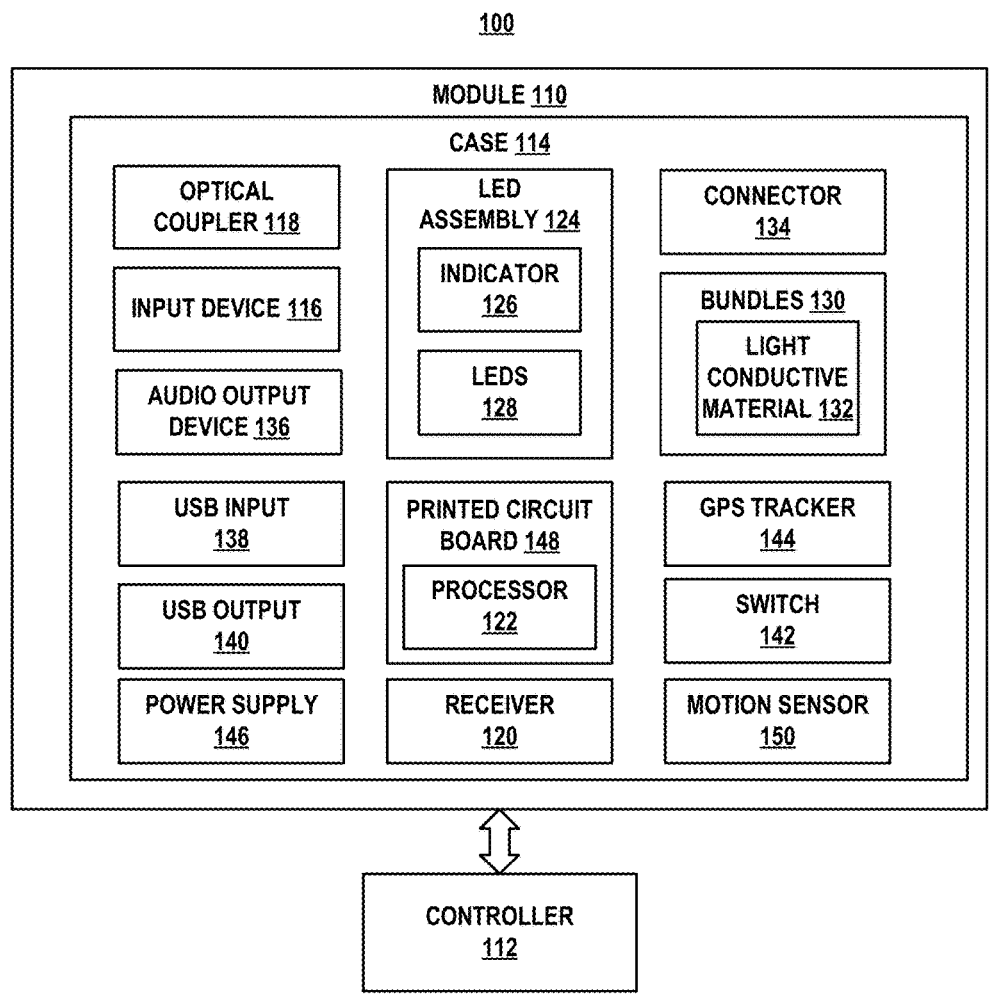
FIG. 1 illustrates a block diagram of an optical coupler system in accordance with the subject matter of this disclosure.

The disclosure is directed to methods and apparatuses that can be implemented through a system for producing a remote controlled lighted output display. The system creates time-framed events that are synchronized to coincide with real time data output. The output is synchronized with animations, cartoons, and sequential movement of graphic images across fabric, semi-solid, or solid objects defined using the end points of fiber optic with the method of controlling the displays remotely by a smartphone for entertainment, utility, and safety functions such as displaying caller ID on any surface, phone numbers, medical data, or other display information without need of any electronic components attached to the item containing the LED/Optic (Light Emitting Diodes using Optical Fiber) display. The use of an audio morphing routine to change the attributes of the voice input allows a user to add another dimension to the output of the remote display installed in an item. For example, one could simulate the voice output for a cartoon character on a toy by morphing their voice through software in the smartphone, so that the audio output from the item would emulate the animated character defined in the lighted display.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

"Bluetooth" refers to a wireless technology standard for exchanging data over short distances (using short-wavelength UHF radio waves in the ISM band from 2.4 to 2.485 GHz) from fixed and mobile devices, and building personal area networks (PANs), which was invented by telecom vendor Ericsson in 1994.

"Zigbee" or "ZigBee" refers to an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Referring to FIG. 1, an exemplary optical coupler system, generally designated as 100, that can implement the described subject matter or portions of the described subject matter is illustrated. The system 100 includes a portable module 110 and a remote controller 112. The module 110 includes a housing or a case 114 containing an input device 116, an optical coupler 118 having a receiver 120, a processor 122, and an LED assembly 124 having an indicator 126 and a plurality of LEDs 128, a bundle 130 of light conductive material 132 and a detachable connector 134 connecting the optical coupler 118 to the bundle 130. In this exemplary embodiment, the controller 112 is a mobile computing devices and, more particularly, a smartphone. The light conductive material 132 can be fiber optic fibers, light transmitting rubber, plastics, or other light transmission media material. These materials can include special rubber and solid plastics that transmit light through edges and perimeters.

The case 114 can be a reinforced case that can be separable and/or removable from any apparel or item upon which the system 100 produces a display. In such embodiments, the bundle 130 of the light conductive material 132 can remain attached to the surface.

The receiver 120 can receive data from the input device 116 that relates to lighting effects having predetermined graphic patterns. The processor 122 can convert the data into instructions for the LEDs 128 to form the predetermined graphic patterns, in which the light varies in configuration, color, intensity, or other properties. The LEDs 128 produce light for transmission through the detachable transparent connector 134 to the bundle 130 so that the light conductive material 132 within the bundle 130 can produce the predetermined graphic patterns.

The system 100 can implement and control the LEDs 128 to generate a display of an image or series of images with or without audio in defined frames of animation, alphanumeric digits, colors, pulses, routines, intensities, including other data displayed from the surface of an item. The system 100 can display information relating to caller ID, bio-physical data using routines or numbers.

The input device 116 can be a microphone, a temperature sensor, or other similar device. In some embodiments, the input device 116 can be incorporated into the controller 112. The controller 112 can send data relating to input received by the input device 116 to the receiver 120.

The connector 134 can be a clear connector. The connector 134 can contain one or more translucent plastic indicator forms such as a rod, but other designs are also contemplated. In such embodiments, the case 114 emits light from the LEDs 128 through the connector 134 to the light conductive material 132 and out of the exterior perimeter of a translucent plastic form.

The module 110 can receive Bluetooth data that determines the lighted effects from the LEDs 128. The LEDs 128 can be mounted within the case 114, so that the output from the LEDs 128 is aligned for transmission through the connector 134 to the light conductive material 132. The light conductive material 132, in the form of optical fibers, can be mounted and aligned to emit light to form graphic patterns in the shapes of images such as, but not limited to, company logos and other graphic images, emoticons, symbols, and foreign language characters, and animated cartoons or motion graphic images. The graphic patterns can include alpha-numeric digits in any size to indicate time, stopwatch functions, dates, phone numbers, distance, price, temperature, heart rate, codes, or other information. In some embodiments, the optical coupler 118 has an ID address via Bluetooth protocol.

The module 110 can produce output to form graphic images through the bundles 130 The graphic images can act as indicators of, but not limited to, caller identification using visual output, user-selectable custom coloring of accents, logos, and other graphic images, games, puzzles, and other inter-active visual based activities, data for marketing products, and announcement of sales. The indicators can be used as anti-theft display visual alarms. The indicators can indicate the receipt of a text message, email, or other form of data retrieval and notification including the use of a silent or concurrent physical vibration notification.

The indicators can be indicators of bio-physical data including heart rate, ECG, temperature, skin moisture, body temperature, humidity, emotional mood, and more. The indicators can use colors, intensities, vibrations, and routines such as flashing, fading, pulsing, or otherwise changing to display bio-physical data such as, but not limited to heart rate, ECG readings, skin moisture, body temperature, and lighting surrounding areas.

As shown in FIG. 1, the module 110 can include other components, such as an audio output device 136, a USB input 138, a USB output 140, an on/off switch 142, a GPS tracker 144, a power supply 146, a printed circuit board or PCB 148, vibration device, and a motion sensor 150. In this exemplary embodiment, the audio output device 136 is a speaker. The power supply 146 can be a rechargeable battery. The processor 122 can be mounted on the PCB 148.

The system 100 configure and implement the receiver 120 as a Bluetooth, Zigbee, or other type of receiver. The receiver 120 can send data to a D to A converter that can be implemented by the processor 122 to cause the LEDs 128 to light up. In some embodiment, the LEDs 128 will be accompanied by audio from the audio output device 136, which can result in a display of audio/visual animation on the surface of an item.

The system 100 utilizes the light transmitting/receiving optical coupler 118, so that the optical coupler 118 passes light through the connector 134 to the light conductive material such as fiber optic bundles 130, which can have the light conductive material 132 mounted on a surface of the case 114. The system 100 can utilize the controller 112 to control the activation of colors and intensities of the LEDs 124. The light can be passed through the connector 134, which can function as a coupler to channel light to surface areas where the opposing ends of the light conductive material 132 within the bundles 130 are attached.

The system 100 can utilize software routines downloaded to the controller 112 to send to the module 110. The routines can include RGB, IR, and/or UV LEDs, speaker, sensors, vibrator, and microphone elements. The system 100 can implement and utilize the receiver 120 to receive signals via wireless transmission from the controller 112 for decoding by the processor 122. The signals can be wireless signals, such as Bluetooth, Zigbee, or other suitable wireless signals.

The system can implement and utilize the GPS tracker 144 and one or more input devices 116 that respond to surrounding conditions such as temperature, time, sound, and location. The GPS tracker 144 can be displayed on the controller 112. Attachments designed to snap onto the system 100 can provide the ability to produce independent lighting effects, including custom controlling of lighted surroundings. GPS tracking can enable the system 100 via software connection to the internet to recognize other couplers or similarly configured systems in the immediate vicinity and subsequently use that data to design the light output routine.

The system 100 can configure and implement the USB output 140 to charge batteries in digital devices. In some embodiments, the USB output 140 can be a charge strip or a USB port that can be used to charge mobile phones, digital tablets, audio players, and/or flashlights.

The system 100 can display data without need of wires attached to bulky meters or other equipment. In such embodiments, the system 100 provides mobility with hands-free operations by embedding the display directly into apparel or on a removable fabric armband that include the module 110.

The system 100 can be configured with a predetermined range limit, so that an alarm will trigger when the distance between the module 110 and the controller 112 exceeds the limit. In some embodiments, this alarm can be used to determine when a purse is stolen. In such embodiments, the GPS tracker 144 can be used to locate the module 110.

The system 100 can be configured to conserve energy by having the switch 142 turn off the receiver 120 in coordination with a timed auto-shut off after several minutes is contemplated. The system 100 can be configured, so that the motion sensor 150 can activate the receiver 120 for a predetermined cycle when the module 110 is moved. The predetermined cycle can last for several minutes to an hour before the switch 142 shuts down the receiver 120 to conserve energy once again.

The system 100 can produce a rainfall (or waterfall) display with an accompanying sound synchronization that, in some embodiments, can be used to denote an alarm function on a remote clock. The system 100 utilizes the LEDs 128 to light up sequentially to result in a chasing or moving display motion perceived on surfaces. The LEDs can produce a display that resembles a rainfall or snowfall effect on some items. The audio output device 136 can be utilized to add sound of rain (or waterfall) when turning on a sequential lighting of LEDs 128 through the fiber optic bundles 130, as described in U.S. Pat. No. 8,217,922, which is incorporated by reference.

The system 100 can produce displays that depict arrows moving across a point-of-purchase (POP) or a sign display to point to a product. The system 100 can activates, in synchronization, a timed voice recording that plays through the audio output device 136 whose recording was created on a smartphone (not shown) and transmitted to the module 110 for playback. The system 100 can re-purpose a POP display by simply reprogramming it via a smartphone to result in cost savings. The system 100 can utilize customized phrases and visual displays to continually change the appearance of a sign, sleeve, toy, or other item according to the desire of a user.

Figure 2:
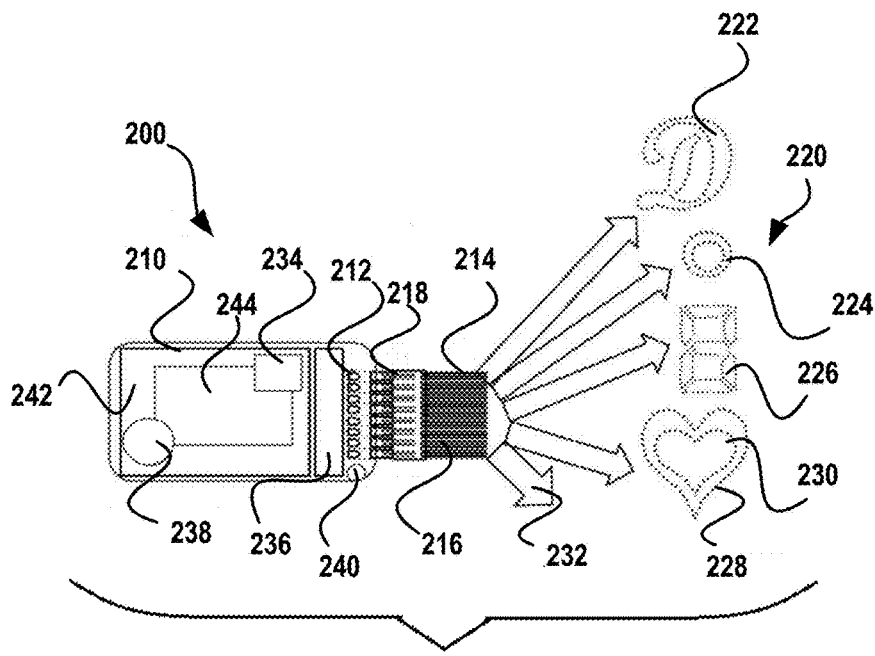
FIG. 2 illustrates a schematic diagram of an embodiment of a module in accordance with the disclosed subject matter.

Referring to FIG. 2 with continuing reference to the foregoing figures, an exemplary module, generally designated as 200, that can implement the described subject matter or portions of the described subject matter is illustrated. The module 200 can be essentially identical to the portable module 110 shown in FIG. 1.

The module 200 includes an optical coupler 210, one or more RGB LEDs 212, bundles 214 of fiber optic fibers 216, a matching connector 218 for connecting the optical coupler 210 to the fiber optic fibers 216. The optical coupler 210 attaches the connector 218, which can hold the bundles 214, so that the fiber optic fibers 216 that have opposing ends attached to surfaces that display a series 220 of graphic images 222-230. In this exemplary embodiment, the graphic images include a letter logo 222, an emoticon 224, a digit 226, and animated frames 228-230 depicting a beating heart. Additionally, the module 220 can produce a beam 232 of light to illuminate an area inside a product such as a purse.

The graphic images 222-230 can be displayed onto substrates in any size. The LEDs 212 can produce graphic image 222-230 that can be seen from larger distances than previous digital displays. The module 220 can provide audio feedback to a user to produce for safety alerts. These alerts can coincide with security data received in real time situations.

The module 200 can produce displays that are user-controllable through the optical coupler 210 by using a Bluetooth receiver 234 transmitting data to a processor 236. The processor 236 can turns on the LEDs 212 to direct light into the bundles 214 in which the fiber optic fibers 216 have posterior ends that are connected to a surface upon which the graphic images 222-230 are being projected.

The module 200 can include a speaker 238, a microphone 240, a battery 242, and a charge strip 244. The speaker 238 can provide audio output from phone calls or other programs installed in a smartphone, such as the controller 112 shown in FIG. 1. The controller 112 can include music files that can be played on the speaker 238.

Microphone 240 can be configured to pick up ambient sounds and/or can be used to input voice commands or use the input to synchronize surrounding music to the graphic images 222-230 or the light beam 232. The battery 242 can be a lithium rechargeable battery, which can be positioned beneath the charge strip 244. The charge strip 244 can be compatible with wireless chargers, so that the module 200 can be positioned to charge an item (not shown) that is connected thereto.

The light beam 232, as well as other output, can be utilized in a routine that lights up the inside of a bag or purse to see the contents when the bag was opened. A user can program the optical coupler 210 to fade up light in pink or any color of their choosing to light up the inside of an item.

The module 200 can form graphic images that are synchronized with audio output from the speaker 238 to act as indicators and audio accompaniment for, but not limited to caller identification using audio output, user-selectable custom coloring of accents, logos, and other graphic images. The graphic images can be synchronized with audio output for games, puzzles, and other inter-active audio-visual based activities or for data for marketing products, announcement of sales with visual and/or audio output.

The synchronized audio and images can be used as anti-theft display visual alarm with audio alarm or as an indicator of the receipt of a text message, email, or other form of data retrieval and notification. The synchronized audio and images can be used to illustrate bio-physical data including heart rate, ECG, temperature, skin moisture, body temperature, humidity, emotional mood, and more using external sensors found in watches or other devices that transmit Bluetooth bio-physical data. The synchronized audio and images can depict facial expressions with audio synchronized mouth movements and/or cartoons with audio synchronization.

In other embodiments, environmental sounds, such as ocean waves, can be coordinated with defined fiber optic visual wave graphics to move to the sounds of the ocean. The module 200 can depict trees waving back and forth to the sound of wind, seagulls flying synched to the audio output of the sound of seagulls, and other similar output. The output can appear at a few simple strokes of input to the external controller 112 shown in FIG. 1. The output can be produced immediately or at another time. In some embodiments, the output can act as an alarm.

Figure 3A:
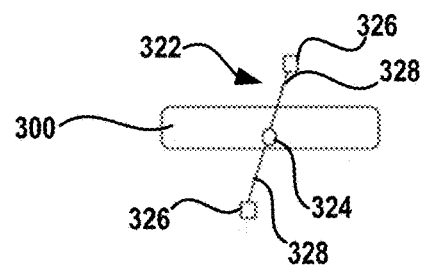
FIG. 3A illustrates a top plan view of an optical coupler in accordance with the subject matter of this disclosure.
Figure 3B:
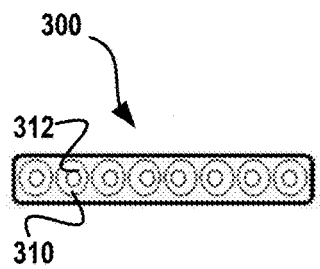
FIG. 3B illustrates an end view of the optical coupler shown in FIG. 1A.
Figure 3C:
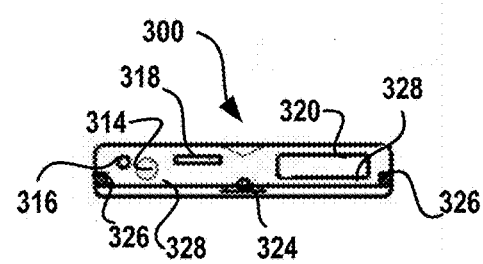
FIG. 3C illustrates an opposite end view of the optical coupler shown in FIGS. 1A-1B.

Referring to FIGS. 3A-3C with continuing reference to the foregoing figures, an exemplary optical coupler, generally designated as 300, that can implement aspects of the described subject matter is illustrated. The optical coupler 300 can be essentially identical to the optical coupler 118 shown in FIG. 1 and/or the optical coupler 210 shown in FIG. 2.

The optical coupler 300 can include a series of tunnels or grooves 310 for receiving one or more of RGB LEDs 312 that are mounted therein. The RGB LEDs 312 can be essentially identical to the LEDs 124 shown in FIG. 1 or the LEDs 212 shown in FIG. 2. The tunnels or grooves 310 can receive the matching transparent connector containing fiber optic fibers, such as the light conductive material 132 shown in FIG. 1 and/or the fiber optic fibers 216 shown in FIG. 2.

The optical coupler 300 can include a switch 314 and an LED indicator 316. The switch 314 activates power to the optical coupler 300. The optical coupler 300 provides power to the LED indicator 316, so that the LED indicator 316 shows when the optical coupler 300 is powered up, as well as can show how much power remains via color changes (i.e., blue for fully charged and red for low power).

The optical coupler 300 can include a plurality of micro and normal USB ports (not shown) that connect to external components 318-320 for charging. The external components 318-320 can be "stand alone" digital device, such as phones, tablets, MPEG players, and/or other similar devices.

The optical coupler 300 can be mounted on an external frame 322. The external frame 322 can include a swivel 324 that includes pads 326 on a pair of arms 328. The swivel 324 can be used to move the optical coupler 300 upright for attaching additional fixtures (not shown). FIG. 3A illustrates the frame 322 in its resting position. The external components 318-320 are contemplated to be mounted on the lengths of the optical coupler 300 so that when the optical coupler 300 is supported by the swivel 324, the press switch 314, the LED indicator 316, and the USB ports (not shown) are easily accessible.

The ability to plug-in external components 318-320 to the optical coupler 300 creates entertaining applications. The swivel 324 and the external frame 322 can be used to allow the optical coupler 300 to stand independently to produce three dimensional displays. These displays can be controlled by the user regarding routines, colors, intensities along with audio output.

The optical coupler 300 can produce displays, such as animated fireworks that change colors on each burst or butterfly/dragonfly flapping wings that change color according to user input are all possible. In some embodiments, external components 318-320 can act as medical alerts. For example, external components 318-320 can communicate with the optical coupler 300 to indicate when heart rates and/or ECG readings exceed certain limits measured by bracelets (not shown) that transmit bio-physical parameters to the optical coupler 300.

Figure 4A:
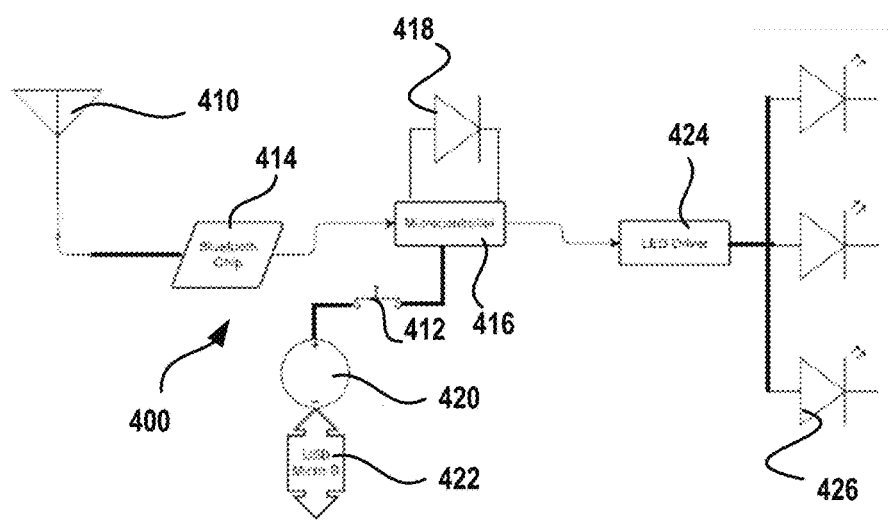
FIG. 4A illustrates an exemplary circuit diagram in accordance with the disclosed subject matter.
Figure 4B:
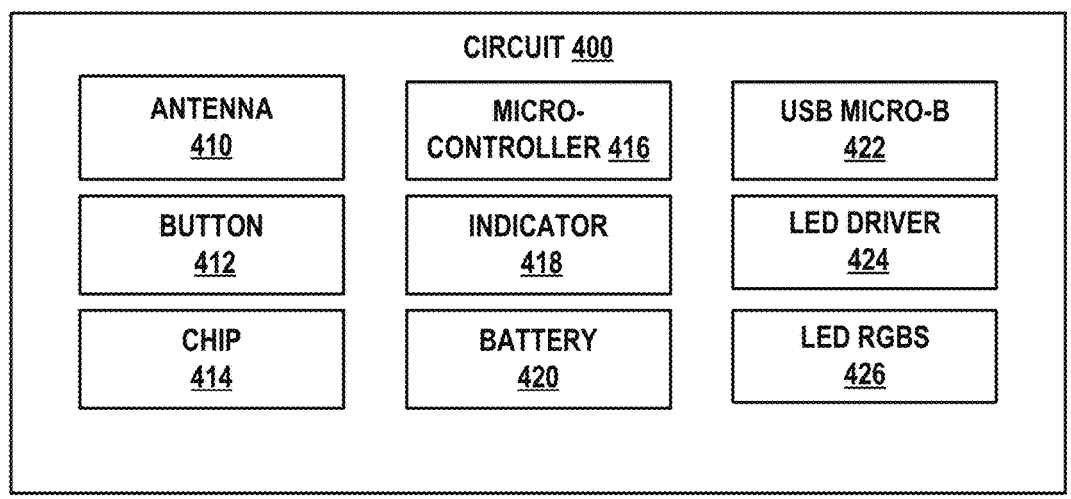
FIG. 4B illustrates an exemplary block diagram for the circuit diagram shown in FIG. 4A in accordance with the disclosed subject matter.

Referring to FIGS. 4A-4B with continuing reference to the foregoing figures, an exemplary circuit, generally designated as 400, that can implement aspects of the described subject matter is illustrated. The circuit 400 includes an antenna 410, a button 412, a chip 414, a microcontroller 416, an indicator 418, a battery 420, a USB Micro-B 422, an LED driver 424, and a plurality of RGB LEDs 426. The RGB LEDs 426 can be essentially identical to the LEDs 124 shown in FIG. 1, the LEDs 212 shown in FIG. 2, and/or the RGB LEDs 312 shown in FIG. 3B.

The circuit 400 can provide the function of a Bluetooth pairing with a master Bluetooth device, such as the controller 112 shown in FIG. 1. The antenna 410 can be an integrated Bluetooth antenna for communicating with the controller 112. The antenna 410 can receive an RGB LED color and lighting routine from the controller 112. The controller 112 can transmit the routine as an ASCII string via a Bluetooth signal that can contain specifications for colors and lighting routine animation numbers. The routine can be identified by an ID number.

The antenna 410 can transmit the routine to the chip 414 in the form of an ASCII string. The chip 414 can be a Bluetooth chip. The chip 414 can transfer the ASCII string to the microcontroller 416. The microcontroller 416 can decode the ASCII string, can store the routines, and lookup the routines by ID number.

The microcontroller 416 can send the routines in the form of instructions to the LED driver 424 to perform the routines as lighting displays and other similar effects. The LED driver 424 can activate the LEDs 426 to display a remote response to an incoming blue tooth data stream in accordance with one or more of the routines.

In some embodiments, the microcontroller 416 can be a component of an assembly that includes an electronic driver or electronic driver circuit. In other embodiments, the microcontroller 416 can be connected to or coupled with an external electronic driver or electronic driver circuit.

The button 412 can be a push button switch to turn the circuit on and off. The indicator 418 can be an LED indicator that can be coupled with the button 412 to indicate when the circuit is on. The battery 420 can be a rechargeable battery. The USB Micro-B 422 can be utilized to recharge the battery 420. In this exemplary embodiment, the button 412 can be a Momentary push button switch. The indicator 418 can indicate when the circuit 400 is powered, charging, and/or paired with a Bluetooth transmitter (not shown).

Figures 5A, 5B:
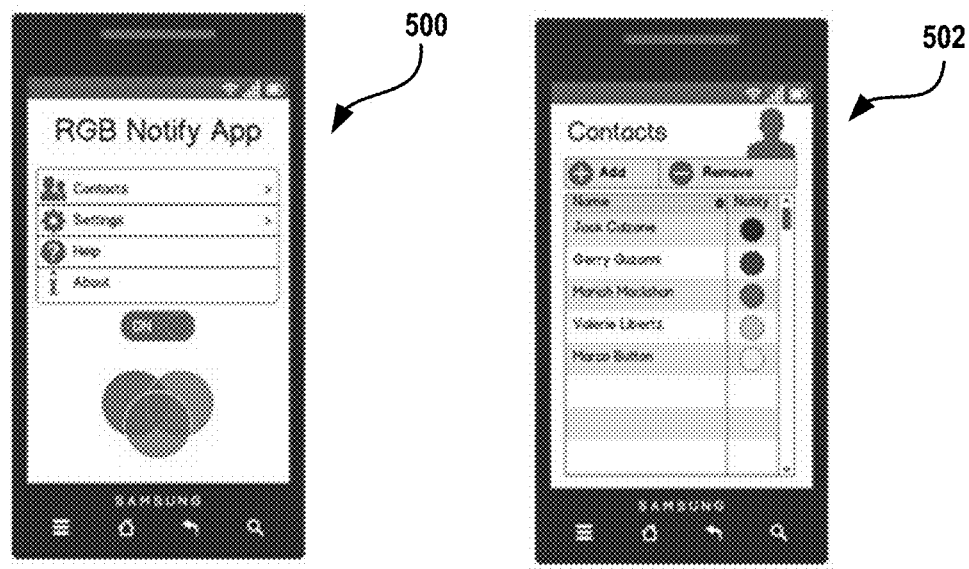
FIGS. 5A-5C illustrate an exemplary graphical interface in accordance with the disclosed subject matter.
Figure 5C:
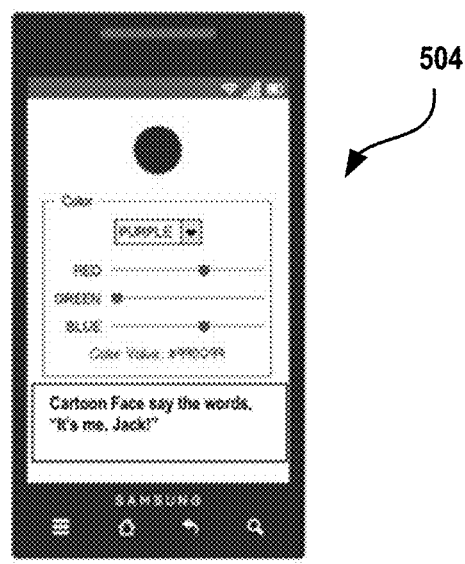

Referring to FIGS. 5A-5C with continuing reference to the foregoing figures, exemplary user interfaces, generally designated by the numerals 500, 502, and 504 are shown. The user interfaces 500, 502, and 504 can implement the disclosed subject matter or portions of the disclosed subject matter by various types of devices, including controller 112 shown in FIG. 1.

User interface 500 depicts a main screen for a mobile computing device application or app that can be used to create or to control audio and visual routines in accordance with the disclosed subject matter. User interface 502 depicts a screen that allows audio and visual routines to be assigned to contacts. User interface 504 depicts a screen that allows a user to choose a phrase and color for the remote animated cartoon to display an audio/visual response from the incoming caller.

User interfaces 500, 502, and 504 can employ a "Touch Screen" interface from a phone to pick and choose the type of display desired. In some embodiments, the displays can be seen and/or heard from the surface of a remote object such as a toy, pillow, plush animal, backpack, purse, bag, sign, apparel, or other surface. In other embodiments, smartphone users can input phrases that will be sent along with the data needed to display the visual attributes associated with the audio input.

This information can be sent to a remote receiver, such as receiver 120 shown in FIG. 1. Upon receipt of such routines, a system, such as system 100 shown in FIG. 1, can display images synchronized along with their audio responses.

The user interfaces 500, 502, and 504 can implement a program that can create a remote display, such as a clock on a wall. The program can utilize voice phrases chosen by the user at specific times for an alarm function. The alarm function can be defined in digital segments or analog hand movements with associated alarm animations appearing at predefined or user-selectable time periods. Unlike existing systems, the system 100 allows users to program the lighting routines via smartphones (i.e., controller 112 shown in FIG. 1) to elicit phrases that the users input therein.

Figure 6:
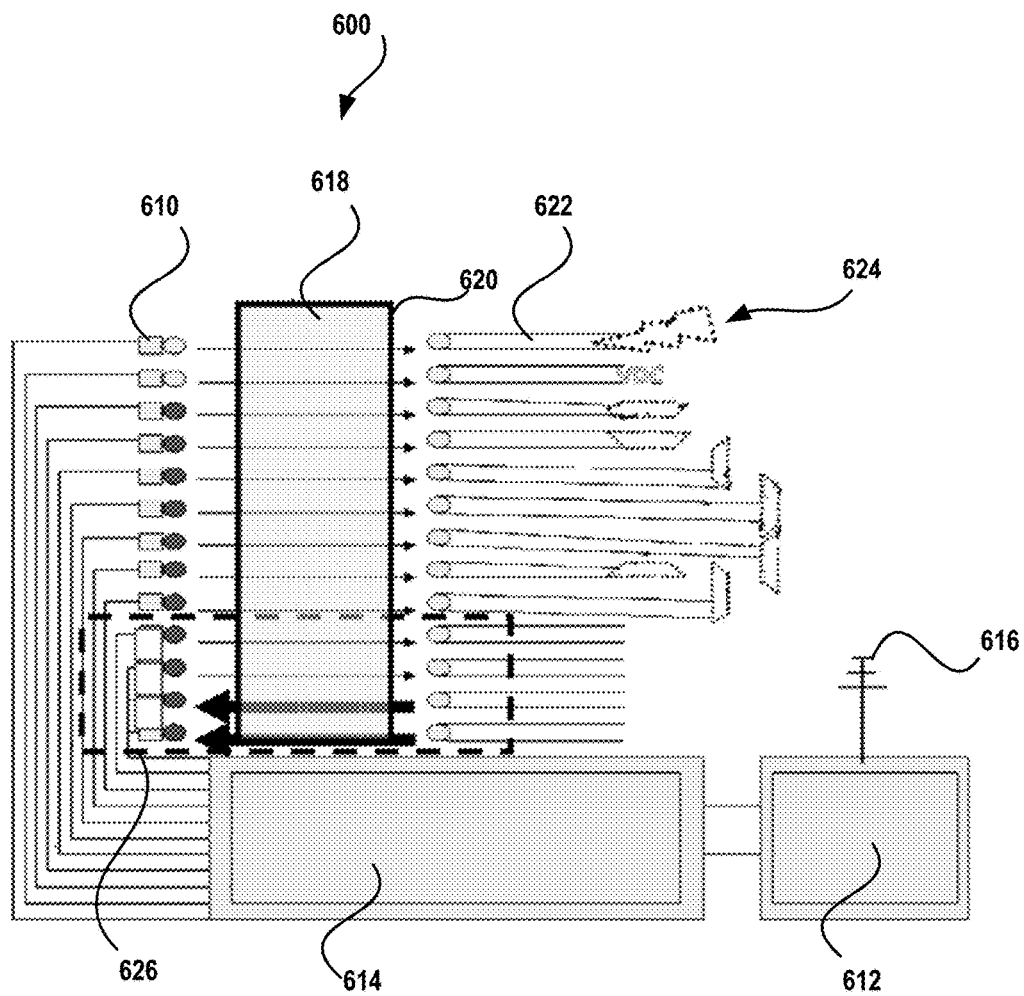
FIG. 6 illustrates a schematic diagram of individual electronic units that control lighting patterns produced by LEDs in accordance with the disclosed subject matter.

Referring to FIG. 6 with continuing reference to the foregoing figures, electronic units, generally designated by the numeral 600, that control the lighting patterns of LEDs, generally designated by the numeral 610. In this exemplary embodiment, the LEDs 610 can be essentially identical to the LEDs 124 shown in FIG. 1, the LEDs 212 shown in FIG. 2, the RGB LEDs 312 shown in FIG. 3B, and/or the RGB LEDs 426 shown in FIGS. 4A-4B, are shown.

The electronic units 600 can include a plurality of receiver/decoders 612 that attach to a main driver PCB 614. The electronic units 600 can include a receiving antenna 616 that can receive digital data for retransmission to a Winbond platform, not excluding others, that can activate the LEDs 610. The LEDs 610 can emit light through an optical coupler 618 into the ends of bundles 620 of optical fibers 622 inside the item connected to a surface to display light through opposing points connected to the surface.

The LEDs 610 can produce graphic images that define alphanumeric characters or graphic elements 624. Alternatively, the LEDs 610 can transmit and receive IR encrypted data and channel it to receptors and transmitters 626 which in turn feeds the pulsed data to the PCB 614 to be processed and converted to light output for either the visible or invisible IR output LEDs to remote receivers to monitor bio-physical statuses of workers, military personnel, or others.

The receiver/decoders 612 can also receive pertinent information about the presence of dangerous gases, orders for movement and warning of hazards through remote or portable sensors. In this exemplary embodiment, the receiver/decoders 612 can be an LED clock driver from Velleman Kit that can be obtained from the Velleman Company in Gavere, Belgium. The receiver/decoders 612 can display the time by lighting up seven elements. In other exemplary embodiments, the main driver PCB 614 can be a printed circuit board obtained from Winbond Electronics Corp. in San Jose, Calif. Specifically, PCB 614 can be the DEMO PCB WHS-5880-h2 v 1.1 version that can be programmable to activate touch sensitive switching between types of data readings.

The PCB 614 can support various types of sensors, including temperature, current & voltage sensors, etc. supplied by the Digikey Company in Thief River Falls, Minn. The sensors can be combined with a multiple digit array drive such as the PM-129A from Circuit Specialists of Mesa, Ariz. In other embodiments, the receiver/decoders 612 can be a module that includes a Bluetooth interface receiver designed to receive bio-physical data readings from sensors as found in the Exmocare BT2 Biotag watch, which can be provided by Exmocare LLC of New York, N.Y.

The receiver/decoders 612 can include sensors that record physical and mental stress parameters through the use of GSR (Galvanic Skin Response), resistance, temperature, IR sensors, etc. and transmits a continuing flow of data to a receiver through a Bluetooth interface.

Referring to FIGS. 7A-7C with continuing reference to the foregoing figures, another embodiment of an exemplary module, generally designated as 700, that can implement the described subject matter or portions of the described subject matter is illustrated. The module 700 includes an optical coupler 710 mounted on frame 712 for swiveling. The optical coupler 710 includes a plurality of RGB LEDs 714 that send light through a connector 716 to a bundle 718 of fiber optic fibers 720. The module 700 utilizes the frame 712 to support the optical coupler 710.

The fiber optic fibers 720 shown in FIG. 7A are arranged in a self-standing spread intended to produce simulated fireworks output 722. The simulated fireworks output 722 is produced by attaching the RGB LEDs 714 to separate areas to result in an upward three dimensional firework display with multiple colors chosen by the user. In this exemplary embodiment, the fiber optic fibers 720 emit lights in any shape and can form layers or spread like fireworks.

The fiber optic fibers 720 can be configured to produce simulated flames, butterfly or dragonfly wings flapping, flowers blooming, and other effects, as well. The optical coupler 710 can produce the output using fiber optics or light conductive plastics and resins without adding additional electronic components to the module 700.

FIG. 7B depicts the production of an indicator of bio-physical conditions 724 through the addition of a light pole or other translucent form to the optical coupler 710. In this exemplary embodiment, the module 700 could flash red if the heart rate of an individual wearing a Bluetooth bracelet (not shown) wirelessly linked to the optical coupler 710 was having a heart problem or turn blue if the ECG of a patient was out of bounds. The optical coupler 710 can be controlled by smart watch (not shown), which can Exmovere Smart Watch.

FIG. 7C depicts the module 700 producing output 726 in the form of an "8" digit. The output 726 contains all the graphic elements necessary to display alpha-numeric characters.

The module 700 can act as a stand-alone monitor for patients with the ability to see it from great distances and occupy a minimal amount of space. The module 700 can utilize a swivel stand, such as the swivel 324 shown in FIGS. 3A-3C, that supports a translucent pillar (or other design) attachment that plugs directly into the top of an optical coupler 710. The optical coupler 710 can active the RGB LEDs 714 to light up in a specific color and/or routine. The optical coupler 710 can be linked to a patient by a Bluetooth monitoring bracelet. When vital signs for a patient cross a predetermined safety barrier, the optical coupler 710 can initiate a routine, such a routine that uses flashing lights and/or predetermined color choices.

Exemplary Output

Figure 8A:
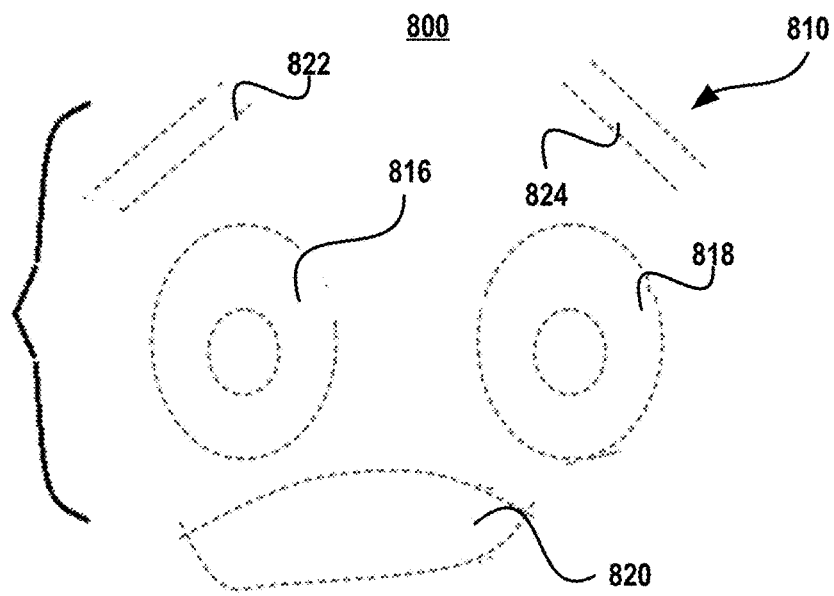
FIGS. 8A-8C illustrate exemplary output produced by the embodiment shown in FIGS. 1-7C.
Figure 8B:
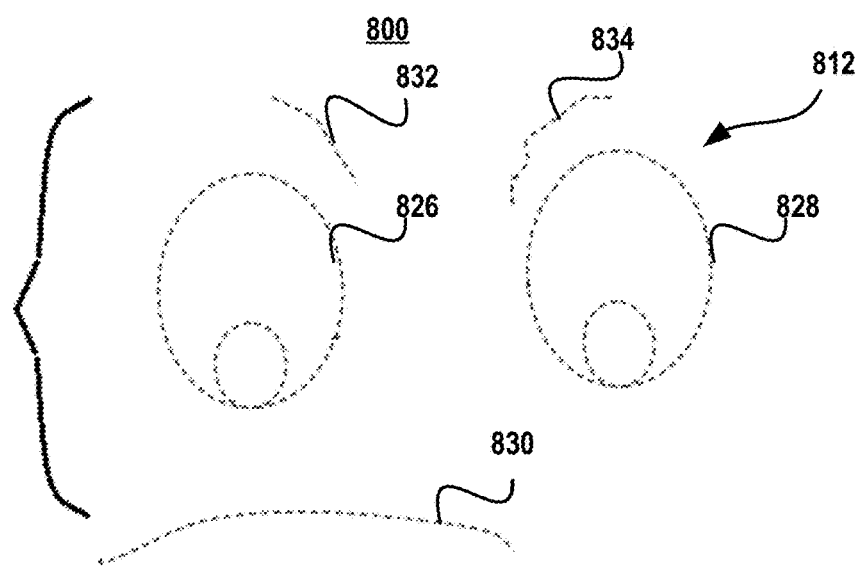
Figure 8C:
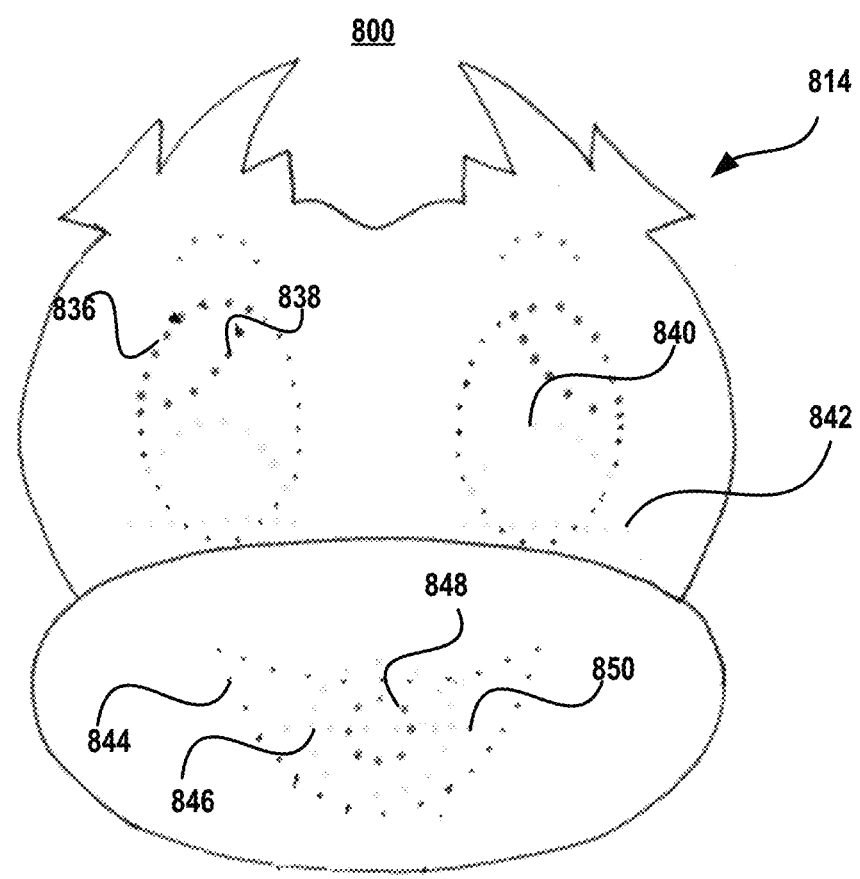

FIGS. 8A-8C illustrate exemplary output that can be produced by an optical coupler system, such as optical coupler 100 shown in FIG. 1, on a surface, generally designated by the numeral 800. The output is produced when the controller 112 transmits data to activate a circuit on the PCB 148 to turn on the LEDs 128. The LEDs 128 transmit light from the optical coupler 118 to the connector 134. The connector 134 transmits the light to the bundles 130, so that the light conductive material 132 can define one or more individual elements that would animate (such as lip movements coordinated with speech) interact between other items in the immediate vicinity themselves via IR or RF communication in full animated and sound responsiveness.

The light conductive material 132 can project light onto surfaces 800 with predefined elements making up faces 810-814. The faces 810-814 can be defined with various eye positions using LED/Optic displays, open and closed mouth positions, eyebrows, etc. The faces 810-814 can appear to talk to each other using LED/optics or other types of lighted defined graphics on both pillows controlled by the data streams transmitted between the two separated surfaces (not shown) originally downloaded to them via a smartphone. The surfaces can be any suitable surfaces, such as two pillows.

The output shown in FIGS. 8A-8C can include graphic images that are synchronized with audio output from the internal speaker to simulate facial motions in real time that depict facial features in real time as they are being spoken into a smartphone using facial caricatures. In other embodiments, the depicted facial features can be synched to an audio file data stream of pre-recorded messages into a smartphone using facial caricatures. For example, laughter, crying, excitement, and/or words can be synchronized to accompany lip movements defined using several separate frames. Synchronization has been shown in U.S. Pat. Nos. 8,217,922 and 8,647,167, which are incorporated by reference.

The output can be lighted display pattern on the surface 800 that can include individual frames that make up portions of a larger graphic area that upon sequencing form the animated motion of facial features, such as lips eyes, and eye brows. The facial features can be synched to audio output of a speaker that simulates actual talking characteristics associated with facial features depicting emotions and speech from semi-solid and fabric surfaces. The output can be used as a marketing display or for advertising products in rugs. The output can be projected on plush forms, such as stuffed character forms, pillars, framed pictures, signs, and other forms of advertising surfaces. The output can be used in plush toys and pillows for children. The output can be used to announce events from signs, walls, rugs, and stuffed applications. The output can be used as directional guidance displays for safety, crowd control, or other guidance.

Referring to FIGS. 8A-8B with continuing reference to the foregoing figures, the faces 810-812 show how an expression can change using bundles of fiber optics. In this exemplary embodiment, two groups of fiber optical fibers, such as the light conductive material 132, shown in FIG. 1, can be attached to two different channels that are formed inside the optical coupler, such as optical coupler 118 shown in FIG. 1, so that the light conductive material 132 can form the face 810 that illustrates a happy face that can be transformed into the face 812 that illustrates a sad face.

The face 810 is formed from a plurality of light patterns 816-824. The light patterns 816-818 form a pair of eyes. The light pattern 820 forms a mouth. The light patterns 822-824 form eyebrows. The eyebrows 822-824 can be moved up and down. The movement can be accompanied by audio output device 136 shown in FIG. 1. The audio can be laughter to emphasize that the face 810 is a happy face.

The face 812 is formed from a plurality of light patterns 826-834. The light patterns 826-828 form a pair of eyes. The light pattern 830 forms a mouth. The light patterns 832-834 form eyebrows. The eyebrows 832-834 can be moved up and down. The movement can be accompanied by audio output device 136 shown in FIG. 1. The audio can be a crying sound, such as the sound of a child crying, to emphasize that the face 810 is a sad face.

Referring to FIG. 8C with continuing reference to the foregoing figures, the face 814 includes facial expressions that include eyes defined by elements 836-842 and a mouth defined by elements 846-850. By lighting the elements 836-850, facial expressions that can be coordinated with recorded sounds to simulate an animated person or character speaking. The elements 836-850 can also form the happy face 810 shown in FIG. 8A and/or the sad face 812 shown in FIG. 8B. Coordinating from sound audio output device 136 shown in FIG. 1 with optic frames formed by the elements 836-850 can display individual movements result in a fully audio/visual cartoon display on the surface 800.

In other embodiments, the depicted facial features in faces 810-814 can be synched to an audio file that has been morphed to sound like something other than the real voice input to a smartphone displaying animated facial features to the incoming audio data stream in real time using facial caricatures. In other embodiments, animated visual graphics can be synched to morphed audio files to semi-solid and flexible surfaces, including surface 800.

FIGS. 9A-9D illustrate exemplary output relating to two-way communication using invisible (and visible) light frequencies via optical fibers through the exemplary optical coupler system 100 shown in FIG. 1. In this exemplary embodiment, the optical coupler system 100 has the ability to display data in more than one frequency of light energy, including frequencies that are outside of the "visible" spectrum. Such output is particularly adapted for uses on the battlefield where displaying visible light would be dangerous at night.

FIG. 9A depicts a front view of an electromagnetic radiation pattern 900 on a surface 902. FIG. 9B depicts a side view of the electromagnetic radiation pattern 900 on the surface 902. FIG. 9C depicts an electromagnetic radiation pattern 904 produced by LEDs 906 that produce infrared light and LEDs 908 that produce visible light. The electromagnetic radiation patterns 900 and 904 can utilize indicators of GPS positioning, bio-physical status, time, company secure identification, codes, and IFF.

The LEDs 906 can send the infrared light through fiber optic fibers 910, which can be IR transmitting plastic fiber optic fibers. In this exemplary embodiment, the fiber optic fibers 910 can be made from PMMA plastic.

FIG. 9D illustrates a two-way communication system 912 using invisible (and visible) light frequencies via optical fibers 914. The light frequencies are produced using LEDs 916 and are received using LEDs 918.

The system 912 can provide an alternative low-level, cost-effective security method for identification means via the use of certain Capacitance Coupled Device (CCD) receiver devices such as a video camcorders and security cameras. Since some CCD cameras are able to detect and display infrared frequencies as white light in viewfinders as well as record such energy in the visible light spectrum, these devices can be cost-effective devices able to be used in low-level security applications such as banks, casinos, hotels, corporations, and the like. Due to the minimal cost impact to produce one embodiment of this technology for identification means, it can be incorporated into uniforms for state and local police, federal law enforcement, military police, security personnel, event staff, hotel bellman, and the like for very little cost impact unlike the methods used for IFF in prior art requiring sophisticated detection equipment.

In some embodiments, the system 912 can be implemented as an IFF system that eliminates the wiring requirement and allow the electronics portion of the IFF system to be completely concealed without need of any exposed LEDs, wiring, PCBs, mounted lenses, external protection encasement structures, or any other type of device worn on the exterior of the body or item for IFF purposes.

In other embodiments, the system 921 can be implemented in a "low-security" mode that could be termed "conceal or reveal" technology. In such embodiments, a user can choose the visible light spectrum for "reveal" identification purposes by incorporating LEDs with visible light output in place of an infrared LED or choose a "conceal" mode by switching on the infrared LEDs alone allowing only those with CCD technology to see it. In such embodiments, the system 912 can be activated, remotely, via a controller, such as the controller 112 shown in FIG. 1. The controller 112 can be a mobile computing device, such as a smartphone.

The system 912 can provide a high level of security identification by incorporating the transponder transmission and reception points as a part of flexible synthetic materials such as fabric, rubber, netting, and the like without any visible attributes so as to make it unobvious to others in the immediate vicinity that transmissions are in progress. This allows the material to become a "smart fabric" insofar as large areas of fabric surface become display media and is able to change the design via Bluetooth sequentially over time to heighten high security protocols.

Exemplary Processes

Figure 10:
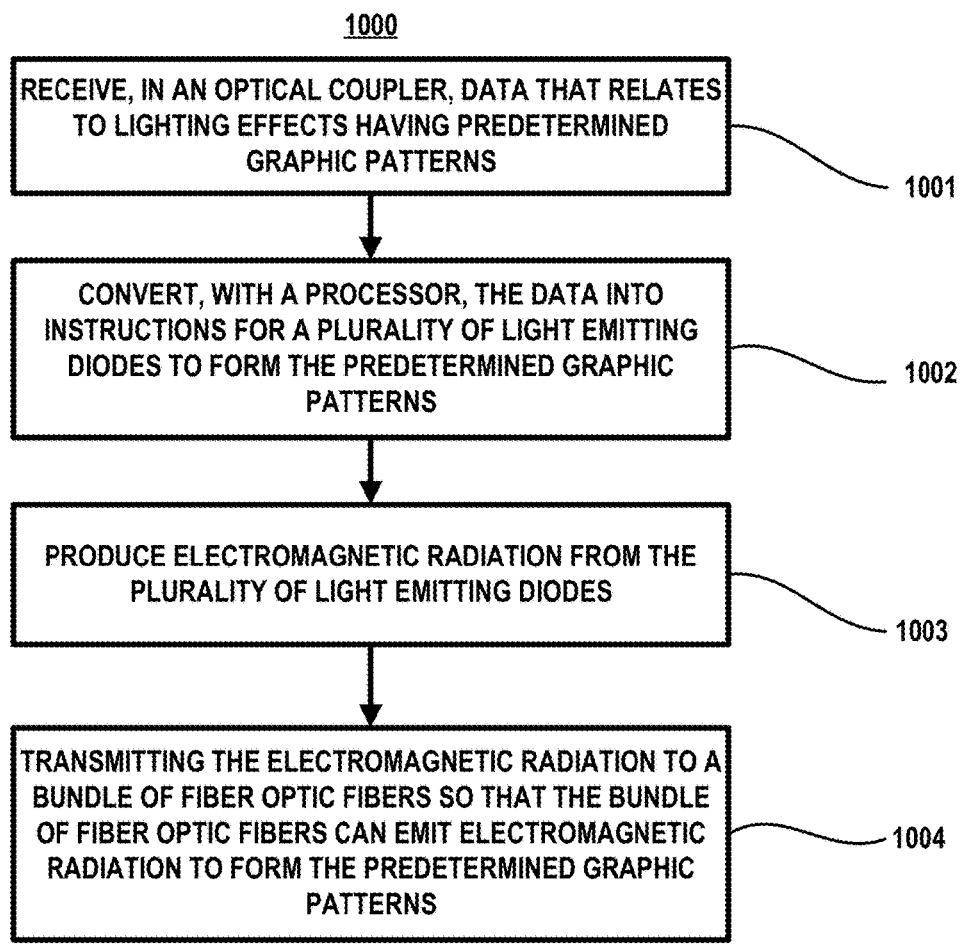
FIG. 10 illustrates an exemplary process in accordance with the disclosed subject matter.

Referring to FIG. 10 with continuing reference to the foregoing figures, a method 1000 is illustrated as an embodiment of an exemplary process for producing light patterns and related effects. Method 1000 can be performed by system 100 shown in FIG. 1 or any other suitable system.

At 1001, an optical coupler receives data that relates to lighting effects having predetermined graphic patterns. In this exemplary embodiment, the optical coupler can be the optical coupler 118 shown in FIG. 1.

At 1002, a processor converts the data into instructions for a plurality of light emitting diodes to form the predetermined graphic patterns. In this exemplary embodiment, the processor can be the processor 122 shown in FIG. 1.

At 1003, electromagnetic radiation is produced from the plurality of light emitting diodes. In this exemplary embodiment, the light emitting diodes can be the LEDs 128 shown in FIG. 1.

At 1004, the electromagnetic radiation is transmitted to a bundle of fiber optic fibers so that the bundle of fiber optic fibers can emit electromagnetic radiation to form the predetermined graphic patterns. In this exemplary embodiment, the bundle can be the bundles 130 of light conductive material 132 shown in FIG. 1.

Figure 11:
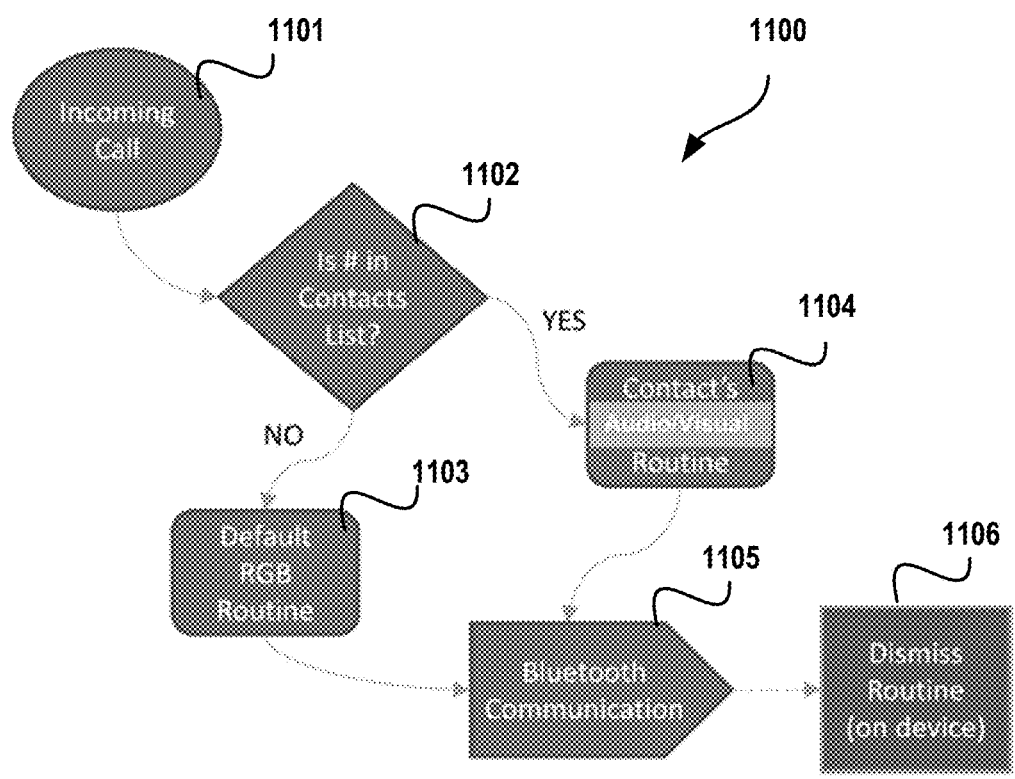
FIG. 11 illustrates another exemplary process in accordance with the disclosed subject matter.

Referring to FIG. 11 with continuing reference to the foregoing figures, a method 1100 is illustrated as an embodiment of an exemplary process for utilizing user interfaces 500, 502, and 504. Method 1100 can be performed by the controller 112 shown in FIG. 1 or any other suitable mobile computing device.

The method 1100 can allow a user to become aware of someone calling their phone and can produce a display routine that alerts them to the identity of the caller. The caller can be identified even if the user does not remove his or her phone from their pockets. The method 1100 can be performed by a system that assigns a color and/or a routine to a caller ID list. The system can display a phone number on any surface without having any electronics installed on the surface.

At 1101, an incoming call is received by a mobile computing device. In this exemplary embodiment, the incoming call can be received by the controller 112 shown in FIG. 1.

At 1102, the mobile computing device determines whether the name or number associated with the incoming call corresponds to a name or number in the contacts list of the mobile computing device.

At 1103, the mobile computing device executes a default routine when the name or number is not listed in the contacts list.

At 1104, the mobile computing device identifies the routine that is associated with the caller when the name or number is listed in the contacts list.

At 1105, the mobile computing device communicates the routine to a module for producing the routine. In this exemplary embodiment, the module can be the module 110 shown in FIG. 1.

At 1106, the mobile computing device dismisses the routine upon completion of the routine.

Supported Features and Embodiments

The detailed description provided above in connection with the appended drawings explicitly describes and supports various features of an optical coupler system. By way of illustration and not limitation, supported embodiments include an apparatus comprising: an input device, an optical coupler having a receiver, a processor, and a plurality of light emitting diodes, a bundle of fiber optic fibers or other light transmitting material, and a detachable connector connecting the optical coupler to the light transmitting material such as fiber optics, wherein the receiver receives data from the input device that relates to lighting effects having predetermined graphic patterns, wherein the processor converts the data into instructions for the plurality of light emitting diodes to form the predetermined graphic patterns, and wherein the plurality of light emitting diodes produce light for transmission through the connector to the light transmitting material so that the light transmitting material such as a bundle of fiber optic fibers can produce the predetermined graphic patterns.

Supported embodiments include the foregoing apparatus, further comprising an external controller for controlling the optical coupler.

Supported embodiments include any of foregoing apparatuses, wherein the external controller is a smartphone.

Supported embodiments include any of foregoing apparatuses, wherein the input device sends data using short-wavelength UHF radio waves to the receiver.

Supported embodiments include any of foregoing apparatuses, further comprising a housing for holding the optical coupler, the bundle of fiber optic fibers, and the connector.

Supported embodiments include any of foregoing apparatuses, wherein the light conductive rubber, plastic, bundle of fiber optic fibers, or other light transmitting materials are mounted in the housing in front of the plurality of light emitting diodes so that one end of each of the fiber optic fibers within the bundle of fiber optic fibers emit light from the housing to form graphic patterns.

Supported embodiments include any of foregoing apparatuses, further comprising a portable power supply for powering plurality of light emitting diodes.

Supported embodiments include any of foregoing apparatuses, wherein the input device is a microphone.

Supported aspects include a system, a method, and/or means for implementing any of the foregoing apparatuses or portions thereof.

Supported embodiments include a method comprising: receiving, in an optical coupler, data that relates to lighting effects having predetermined graphic patterns, converting, with a processor, the data into instructions for a plurality of light emitting diodes to form the predetermined graphic patterns, producing electromagnetic radiation from the plurality of light emitting diodes, and transmitting the electromagnetic radiation to a bundle of fiber optic fibers so that the bundle of fiber optic fibers can emit electromagnetic radiation to form the predetermined graphic patterns.

Supported embodiments include the foregoing method, wherein the transmitting step includes the bundle of fiber optic fibers emitting electromagnetic radiation in the form of light that forms designs selected from the group consisting of company logo, graphic images, emoticons, symbols, foreign language characters, animated cartoons, motion graphic images, and alpha-numeric digits.

Supported embodiments include any of the foregoing methods, wherein the transmitting step includes the bundle of fiber optic fibers emitting electromagnetic radiation in the form of light that forms graphic images lighted routines, or varied intensities that act as indicators of the group consisting of caller Identification visual output, colored accents, colored logos, games, puzzles, marketing data, visual alarms, receipt of text message notifications, receipt of email notifications, and biophysical data.

Supported embodiments include any of the foregoing methods, further comprising: synchronizing graphic images with audio output from an internal speaker with the graphical images selected from the group consisting of caller Identification visual output, colored accents, colored logos, graphical images for games, graphical images for puzzles, marketing data images, visual or vibration alarms, receipt of text message notifications, receipt of email notifications, biophysical data images, facial expressions, and cartoons.

Supported embodiments include any of the foregoing methods, further comprising: displaying the predetermined graphic patterns to represent bio-physical data selected from the group consisting of heart rates, ECG readings, skin moisture, body temperature, and lighting for surrounding areas of the body.

Supported embodiments include any of the foregoing methods, further comprising: displaying the predetermined graphic patterns as a real time representation of facial features that are captured by a smartphone.

Supported embodiments include any of the foregoing methods, further comprising: displaying the predetermined graphic patterns to represent facial features synced to an audio file data stream of pre-recorded messages into a smartphone.

Supported embodiments include any of the foregoing methods, further comprising: connecting the smartphone to the optical coupler through a wireless connection.

Supported embodiments include any of the foregoing methods, further comprising: displaying the predetermined graphic patterns as animated visual graphics synced to morphed audio files to semi-solid and flexible surfaces with pre-defined sub-elements necessary to define complete animated motions of facial features.

Supported embodiments include any of the foregoing methods, wherein the transmitting step includes the bundle of fiber optic fibers emitting electromagnetic radiation in the form of light that forms the predetermined graphic patterns that simulate actual talking characteristics associated with facial features.

Supported embodiments include any of the foregoing methods, wherein the transmitting step includes the bundle of fiber optic fibers emitting invisible electromagnetic radiation to form the predetermined graphic patterns that are indicators selected from the group consisting of indicators of GPS positioning, bio-physical status, time, company secure identification, codes, and IFF.

Supported aspects include a system, an apparatus, and/or means for implementing and/or performing any of the foregoing methods or portions thereof.

Supported embodiments include an optical coupler system comprising: means for receiving data that relates to lighting effects having predetermined graphic patterns, means for converting the data into instructions for a plurality of light emitting diodes to form the predetermined graphic patterns, means for producing electromagnetic radiation from the plurality of light emitting diodes, and means for transmitting the electromagnetic radiation to a bundle of fiber optic fibers so that the bundle of fiber optic fibers can emit electromagnetic radiation to form the predetermined graphic patterns.

Supported embodiments include an apparatus comprising: an electronic driver, an optically clear removable matching connector coupled to the electronic driver at one end, a bundle having light conductive material attached to the optically clear removable matching connector at the other end, wherein the electronic driver transmits light through the optically clear removable matching connector to the bundle, so that the bundle produces lighting effects having predetermined graphic patterns.

Supported embodiments can provide various attendant and/or technical advantages in terms of improved efficiency and/or savings with respect to an optical coupler system that works efficiently when an object that is being observed is not aligned properly with an IR receiver, is exposed to potential damage or dirt, consumes too much power, and is recognizable from any observer including those who cannot be intended. Such embodiments can provide a user with the ability to change the dynamics of a lighted display instantly from any smartphone without any electronics, LEDs, or batteries mounted in the item.

Supported embodiments include a system that includes a mounted LED/optic display that is attached to a receiving optical connector that can be used to define images, produce audio output that accompanies the images, and be controlled by a smartphone, remotely. Such a system can be machine washed, can reduce, and/or can eliminate the use of electronic parts that are used in the production of a light display. The reduction or elimination of electronic parts reduces or eliminates failure points through the use of LEDs/optic displays mounted thereon. Such embodiments require minimal protection and do not utilize wires or other components that are prone to failure from motion and/or water contact thus minimizing impacts on waste disposal by eliminating battery, PCB, and other material issues.

Supported embodiments include a system that provides the user with the ability to produce a lighted display on any surface via a smartphone instantly. Such embodiments can include an optical coupler system that utilizes smartphone data connectivity to eliminate the shortcomings of existing systems that enable a two-way encrypted communication verification to insure proper ID. Such embodiments can eliminate electronics through the use of an optical connector that feeds light into an embedded LED/Optic display area, such that the system leaves only fiber optics in the surface or item.

Supported embodiments overcome limitations in known devices that produce digital characters that are too small to see from a distance. Such embodiments addresses the inability to read digits from afar by displaying any size digit readable from great distances, that is machine washable, that controlled by a smartphone or other device, and that eliminates all electronics from the item. Such embodiments can address the issue of size by separating the light sources from the surface and using fiber optic cables to define any size digits on surfaces to be seen from large distances.

Supported embodiments include a system that overcomes limitations in known devices in which lighted output from a surface cannot change colors, patterns, intensities, and speed. Such devices cannot display alpha numeric digital information in any color, in the invisible light spectrum (infrared), and adjust speed of routines remotely.

Supported embodiments overcome known limitations relating to the inability of known devices that prevent them from being installed into machine washable, rugged apparel, bags, or other items that could be useful for retrieving data from a smartphone and displaying it on surfaces that can be subjected to harsh, unpredictable high impacts, and underwater environments. Support embodiments overcome the inability of known systems to puncture easily, which renders them totally useless, break easily upon high impacts, are prone to scratching, and draw substantial power eliminating their use for extended periods of time beyond several hours on batteries.

Supported embodiments include a system that can be applied to apparel, pillows, or other such surfaces that do not allow for supporting the hardware necessary to drive those types of color output displays. Such embodiments can produce inexpensive displays that do not require a great deal of energy without the need to keep them active, which renders battery assisted video panels impractical for many situations for many known devices. Such embodiments can include the use of a rechargeable battery able to be used in laptops, remote power chargers, plug-in chargers, and wireless chargers to keep the battery at full charge.

Supported embodiments include a system that includes display technology that is both affordable along with a low enough current drain to allow for audio/visual displays to be applied to surfaces such as pillows, toys, decorations, bags, and signs to make them multimedia informative surfaces without draining batteries quickly. Such embodiments can include systems in which punctures do not affect the output of the entire display. Such embodiments eliminate all electronics from an item that employs a lighted output display.

Supported embodiments include a system that addresses is the issue of not knowing who is calling on a phone if the phone is placed inside a bag, backpack, or other item that conceals the screen from being seen. Such embodiments are particularly useful when users receive calls when driving or occupied in some way that directs their attention away from the phone.

Supported embodiments allows surfaces to become audio/visual output displays controlled by smartphones. Such embodiments require a fraction of the energy necessary to drive conventional video, EL, and LED displays thus allowing audio/visual displays to continue running for extended periods on a small rechargeable battery able to fit inside toys, bags, and other small items.

Supported embodiments include a system that can synchronize audio output to the visual display elements or can control the audio output/visual display elements with a smartphone device, remotely.

Supported embodiments include a smartphone that is enabled to control such IFF indicators, remotely. These embodiments can be highly usable for security protocols requiring a two-way confirmation of the ID of an individual wearing a flexible display.

Supported embodiments include a light weight, flexible, data display that is impervious to machine washings, high velocity impacts, scratch resistant, works underwater, requiring minimal current that can be worn freeing both hands to hold probes, weapons, tools, or other objects without need of a platform to support a meter, CRT, or other data display device and has the ability to show data in the 'Visible' and 'Invisible' Infrared frequency ranges to be seen in daylight and switched to IR at night for FLIR (Forward Looking Infrared) night vision equipment visibility that can receive data and display it on a sleeve freeing the hands of holding a smartphone that could be stored safely in a pocket or nearby bag.

Supported embodiments include a system that provides a secure and redundant method of transponder data communication by using thousands of transmission/reception points throughout the fabric composition of the apparel worn by a user. A significant portion of the fabric could be destroyed during activity without any noticeable function degradation. This is an improvement over known systems that cease to function when one or a few infrared diodes are exposed to damage.

Supported embodiments include an environmentally friendly or "green" opti-coupler system that does not result in the disposal of lithium batteries, PCBs, and other similar waste materials, such as lead solder joints, in landfills. The undesirable materials are not used in clothing or other similar products, which can meet certain e-textile standards.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. In particular, it should be understood that the disclosed stem assembly can be used with stethoscopes that include a single earpiece. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An apparatus, comprising:
an optical coupler portable module comprising a portable power supply therein, a receiver, a processor, and an external receiving surface, the external receiving surface holding at least one light emitting diode;
a bundle of fibers having light conductive material;
a detachable connector receivable by the external receiving surface of the optical coupler;
an input device;
wherein the portable power supply powers the at least one light emitting diode;
wherein the input device sends data to the receiver though a wireless connection;
wherein the receiver receives data relating to a lighting effect;
wherein the processor converts the data into instructions for the at least one light emitting diode to program the optical coupler portable module to form predetermined graphics patterns with the bundle of fibers; and
wherein the detachable connector optically connects the at least one light emitting diode and the bundle of fibers having light conductive material when the detachable connector is received by the external receiving surface of the optical coupler, so that the at least one light emitting diode can project light through the detachable connector and the bundle of fibers to form the predetermined graphics patterns.

2. The apparatus of claim 1, wherein the external receiving surface comprises a plurality of recesses, each recess having a light emitting diode mounted therein, wherein the detachable connected is receivable within the plurality of recesses.

3. The apparatus of claim 1 wherein the bundle fibers having light conductive material is connected to a surface upon which the light is projected.

4. The apparatus of claim 3 wherein the surface is a surface of apparel for wearing on a body, the apparel having fabric.

5. The apparatus of claim 1, wherein the input device is selected from the group consisting of a smartphone and a microphone.

6. The apparatus of claim 5, wherein the smartphone sends data using short-wavelength UHF radio waves to the receiver.

7. The apparatus of claim 1, wherein the input device sends data to processor to reprogram the optical coupler portable module.

8. The apparatus of claim 1, wherein the light conductive material are fiber optic fibers.

9. The apparatus of claim 8, further comprising a housing for holding the optical coupler, the bundle of fiber optic fibers, and the connector.

10. The apparatus of claim 1, further comprising a portable power supply for powering the at least one light emitting diode.

11. A method for producing a remote controlled lighted output display,
wherein a portable module optical coupler has a power supply therein, a receiver, a processor, and an external receiving surface, the external receiving surface holding at least one light emitting diode,
wherein a bundle of fibers has light conductive material,
wherein a detachable connector connects the portable module optical coupler to the bundle of fibers, and
wherein an input device connects to the receiver through a wireless connection,
the method comprising:
powering the at least one light emitting diode with the portable power supply;
sending data relating to a lighting effect to the receiver though a wireless connection;
converting the data into instructions for programming the at least one light emitting diode to form predetermined graphics patterns with the bundle of fibers; and
projecting light through the detachable connector and the bundle of fibers to form the predetermined graphics patterns.

12. The method of claim 11, wherein the projecting step includes the light conductive material emitting electromagnetic radiation in the form of light that forms designs selected from the group consisting of company logo, graphic images, emoticons, symbols, foreign language characters, animated cartoons, motion graphic images, and alpha-numeric digits.

13. The method of claim 11, wherein the projecting step includes the light conductive material emitting electromagnetic radiation in the form of light that forms graphic images that act as indicators of the group consisting of caller identification visual output, colored accents, colored logos, games, puzzles, marketing data, visual alarms, receipt of text message notifications, receipt of email notifications, and biophysical data.

14. The method of claim 11, further comprising:
synchronizing graphic images with audio output from an internal speaker with the graphical images selected from the group consisting of caller Identification visual output, colored accents, colored logos, graphical images for games, graphical images for puzzles, marketing data images, visual alarms, receipt of text message notifications, receipt of email notifications, biophysical data images, facial expressions, and cartoons.

15. The method of claim 11, further comprising:
displaying the predetermined graphic patterns to represent bio-physical data selected from the group consisting of heart rates, skin moisture, body temperature, and lighting for surrounding areas of the body.

16. The method of claim 11, further comprising:
displaying the predetermined graphic patterns as a real time representation of facial features that are captured by a smartphone; and
synching the real time representation of facial features to an audio file data stream of pre-recorded messages into a smartphone.

17. The method of claim 11, further comprising:
reprogramming portable module optical coupler with a smartphone.

18. The method of claim 11, further comprising:
displaying the predetermined graphic patterns as animated visual graphics synced to morphed audio files to semi-solid and flexible surfaces with pre-defined sub-elements necessary to define complete animated motions of facial features.

19. The method of claim 11, wherein the transmitting step includes the bundle of fiber optic fibers emitting electromagnetic radiation in the form of light that forms the predetermined graphic patterns that simulate actual talking characteristics associated with facial features.

\* \* \* \* \*